Figure 1:
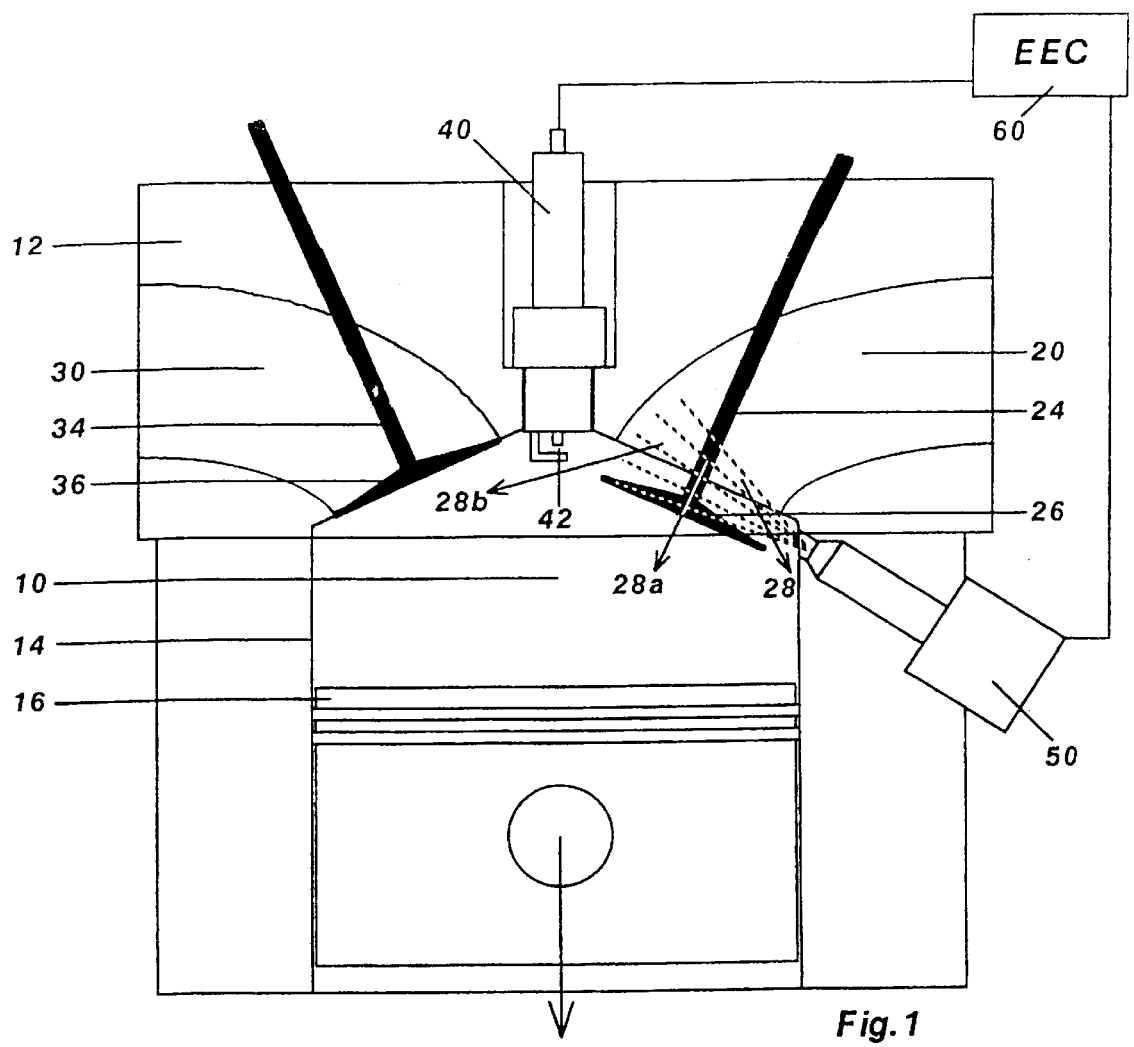

United States Patent
Hei Ma

[11] Patent Number: 6,148,792
[45] Date of Patent: Nov. 21, 2000

[54] DIRECT INJECTION SPARK IGNITION ENGINE

[75] Inventor: Thomas Tsoi Hei Ma, Chelmsford, United Kingdom

[73] Assignee: Ford Global Technologies, Inc., Dearborn, Mich.

[21] Appl. No.: 09/355,477

[22] PCT Filed: Dec. 31, 1997

[86] PCT No.: PCT/GB97/03541

§ 371 Date: Jul. 30, 1999

§ 102(e) Date: Jul. 30, 1999

[87] PCT Pub. No.: WO98/34023

PCT Pub. Date: Aug. 6, 1998

[30] Foreign Application Priority Data

Feb. 1, 1997 [GB] United Kingdom .................... 9702109
Jun. 13, 1997 [GB] United Kingdom .................... 9712201

[51] Int. Cl.[7] ........................................... F02B 3/02
[52] U.S. Cl. ............................................. 123/298; 123/305
[58] Field of Search ..................... 123/295, 298, 123/308, 305

[56] References Cited

U.S. PATENT DOCUMENTS

| | | | |
|---|---|---|---|
| 2,800,118 | 7/1957 | Scherenberg | 123/298 |
| 5,357,925 | 10/1994 | Sasaki | 123/298 |
| 5,735,240 | 4/1998 | Ito et al. | 123/305 |

FOREIGN PATENT DOCUMENTS

| | | | |
|---|---|---|---|
| 82096 | 10/1956 | Denmark | 123/298 |
| 2663686 | 12/1991 | France | 123/298 |

*Primary Examiner*—Erick Solis
*Attorney, Agent, or Firm*—Jerome R. Drouillard

[57] ABSTRACT

An internal combustion engine is disclosed in which, at least during part load and full load operation of the engine, fuel is injected into the combustion chamber (10) during the intake stroke while an intake valve (26) is open by means of an injector (50) positioned in an unswept part of the cylinder bore (14). The fuel spary passes through the mouth of the intake valve (26) against the flow of high velocity air leaving the intake valve (26) and enters directly into the end of the intake port (20) penetrating laterally across the through-flow cross section of the intake port (20).

7 Claims, 2 Drawing Sheets

DIRECT INJECTION SPARK IGNITION ENGINE

The present invention relates to a spark ignition internal combustion engine having direct injection of liquid fuel into each engine cylinder.

Direct injection spark ignition engines are advantageous in that they may be run with a homogeneous charge for high load operation as well as a stratified charge for lean burn or part load operation. For homogeneous charge, the fuel can be injected early in the cycle (when the piston is near the bottom of its stroke) and is mixed well with the air before it is ignited. For stratified charge, on the other hand, it is necessary to inject later in the cycle when the piston is nearer the top of the compression stroke so that the fuel does not have sufficient time to mix with the air before it is ignited. This mode of operation, however, has certain problems in that fuel injected late in the cycle is deposited on the piston and unavoidably wets the piston surface. The fuel adhering to the surface of the piston is difficult to burn because it is not well mixed with air and for this reason it causes high hydrocarbon and soot emissions. If fuel is injected earlier in the compression stroke to reduce wetting of the piston, the spark timing must also be advanced in order to ignite an ignitable region of the stratified charge and the thermodynamic efficiency of the engine could suffer because the heat release could occur too early compared with the optimum timing for maximum power.

A further disadvantage of the conventional combustion chamber design employed in direct injection engines is that the fuel spray is aimed away from the spark plug in order to avoid wetting the spark plug electrodes and when a stratified charge is to be achieved it is difficult to ensure that an ignitable region is present in the vicinity of the spark plug.

It has been proposed in U.S. Pat. No. 5,421,301 to place one or more injectors in the side wall of the cylinder within the area of the cylinder bore swept by the piston rings and to aim the spray towards the cylinder head, rather than the piston, in particular towards the exhaust valve. The injectors in this patent are low pressure injectors and need to be isolated from the combustion chamber by the piston at the top of the compression stroke and injection can only therefore take place during the intake stroke or at the latest at the start of the compression stroke. The aim of the invention is to vaporise the fuel using the heat of the exhaust valve. The disadvantage of this proposal is that because of the fuel vaporisation by an early stage in the compression stroke the engine can only be operated with a homogeneous charge. The advantages associated with a stratified charge, for which direct injection should excel, cannot be realised using this proposal.

It has also been proposed in U.S. Pat. No. 5,233,956 to position the fuel injector in the cylinder head in such a way that while the fuel spray is aimed towards a cavity in the piston to create a charge when injected during the compression stroke, it is also aimed at the rear face of an intake valve when the intake valve is above a predetermined lift position when injected during the intake stroke. The intention is for the fuel spray to impinge on the rear face of the intake valve and to bounce back into the intake port before being drawn into the combustion chamber. The fuel injector is operated at a pressure in excess of 70 kg/cm$^2$ in order to ensure the fuel spray impinges with force on the valve in order to bounce off the valve. Such an arrangement is effective in allowing a large quantity of fuel to be introduced into the combustion chamber without risk of excessively wetting the piston. On the other hand, because the fuel spray is deliberately arranged to impinge on the rear face of the intake valve, the valve itself will inevitably be wet with fuel.

Wetting of the intake valve is not desirable for several reasons. First, the rate of evaporation of the liquid fuel film is significantly lower than that of very fine fuel droplets because of the much smaller surface area. Second, any liquid fuel film accumulating on the intake valve could cause fuel calibration delay problems during cold start and transient operating conditions. Third, the heat of evaporation of the fuel film is drawn from the intake valve and not from the intake air as in the case of dispersed fine droplets, resulting in lesser cooling of the intake air charge and lesser associated improvements in volumetric efficiency and knock tolerance compared with evaporation in air.

With a view of mitigating at least some of the foregoing disadvantages, the present invention provides a spark ignition internal combustion engine having a variable volume combustion chamber defined by a cylinder head, a cylinder bore and a piston reciprocating within the cylinder bore, the cylinder head having a spark plug and intake and exhaust ports leading through intake and exhaust valves into the combustion chamber, wherein a fuel injector is provided in the combustion chamber for direct injection of liquid fuel, the fuel injector being positioned in an unswept part of the cylinder bore and being oriented such that the fuel is aimed by the injector along a line of sight that extends from the injector through the mouth of the intake valve when the intake valve is open and reaches directly into the end of the intake port, whereby fuel droplets from the injector may pass into the end of the intake port without first impinging on the rear surface of the intake valve.

Preferably the fuel spray from the fuel injector has a small conical angle and is aligned in an offset position from the stem of the intake valve such that the fuel spray enters directly into the intake port without colliding with the stem or the rear face of the intake valve. In practice, this limits the conical angle of the fuel spray to between 20° and 30°.

In a preferred embodiment of the invention, the spark plug is positioned in the cylinder head on the line of the fuel spray and on the opposite side of the intake valve from the fuel injector, such that if fuel is injected while the intake valve is closed, the fuel will travel towards the vicinity of the spark plug. Such an arrangement creates a stratified charge which is immediately ignitable but risks wetting the spark plug electrodes if too much fuel is directed towards it. The risk of wetting the spark plug can however be reduced in a preferred embodiment of the invention by timing the injection such that only sufficient fuel is injected at the end of the compression stroke to create an ignitable cloud, the remainder of the fuel required for producing power being injected at an earlier stage in the cycle to mix homogeneously with the intake air.

In operation, the fuel injected while the intake valve is open will have droplets varying in size. The smaller droplets will be slowed down by the drag of the intake air flowing at high speed through the mouth of the intake valve in the opposite direction and will rapidly change directions in the intake air stream and come out of the mouth of the intake valve from the same side as they enter. The larger droplets will be slowed down by the intake air stream but will enter into the end of the intake port. From there, they are swept laterally by the air flow within the intake port and carried back into the combustion chamber over the skirt of the valve. In both cases, the fuel is mixed homogeneously with the intake air without the fuel bouncing off the surface of the intake valve or the intake port and the resultant charge distribution is similar to that achieved with port fuel injection. However, unlike port fuel injection, the fuel is evaporated much more effectively and there is little or no wall wetting of the intake port or the intake valve for a combination of reasons. First the fuel is aimed to pass through the mouth of the intake valve at a high relative velocity against the air flow and is subjected to very high viscous drag and intense evaporation causing the droplets to slow down and diminish in size very rapidly. Second, those droplets entering into the end of the intake port are directed to penetrate across the unobstructed through flow cross-section of the intake port where they remain air-borne and are entrained laterally by the air through flow as they exit the intake valve. Lastly, the in-cylinder fuel injector operating at a high fuel pressure produces much finer fuel droplets than a low pressure port fuel injector. As the momentum of the droplets decreases exponentially with the cube of their diameters, the fine droplets cannot penetrate very far before being completely evaporated with much less tendency to wet the intake port or the intake valve.

As the fuel is not directed towards the piston, the problems of soot and hydrocarbon emissions resulting from fuel adhering to the piston are avoided. Fouling of the spark plug caused by fuel wetting of the spark plug electrodes is also prevented because the fuel cannot reach the spark plug when injected into the intake port during the intake stroke.

A stratified charge can be achieved whenever desired by injecting a small quantity of fuel using the same injector but at a time when the intake valve is closed. In this case, the fuel is injected late in the compression stroke and is aimed by default towards the front face of the intake valve in the direction of the spark plug, creating a readily ignitable cloud near the spark plug.

Depending on the operating mode, such late fuel injection timing can be used either alone or in combination with an earlier injection into the intake port in order to achieve a variable degree of charge stratification.

In particular, under idling and low load conditions, when the injected fuel quantity is small, a late injection alone will suffice. This will produce a stratified charge that can be easily ignited, thereby ensuring robust ignition even under unthrottled air intake conditions.

Under part load conditions, two injections are used to achieve an ignitable overall lean mixture. The fuel dispersed by the early injection towards the open mouth of the intake port will produce a lean homogeneous mixture which may not be ignitable and the second injection after the intake valve has closed will produce the local high concentration of fuel in the vicinity of the spark plug to ensure robust ignition. The early injection can be regulated to vary the overall air to fuel ratio with the prevailing engine load but the second injection need not vary with load as it is merely providing a local ignitable cloud of charge in the vicinity of the spark plug. The small quantity of fuel in the second injection causes minimal wall wetting of the cylinder head and does not create a serious emissions problem. The bulk of the fuel on the other hand is carried by the intake charge into the cylinder during the earlier injection and creates no more wall wetting than in a port injection engine. Once the fuel rich cloud created by the second injection has been ignited, the flame will propagate to burn the fuel in the leaner regions of the trapped intake charge completely.

Under high load conditions, it is possible to dispense with the late injection as the entire homogeneous charge will be readily ignitable.

It can thus be seen that the preferred embodiment of the invention can be used to achieve optimal charge stratification conditions under all operating loads while avoiding the problems of wetting of the intake port associated with port injection engines and problems of wetting of the walls of the combustion chamber associated with direct injection engines.

Figure 2:
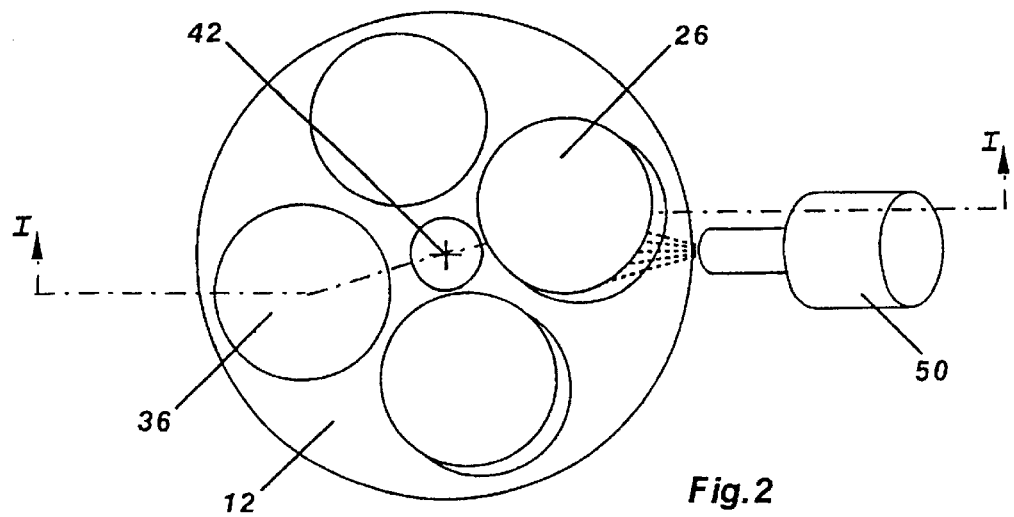
Figure 3:
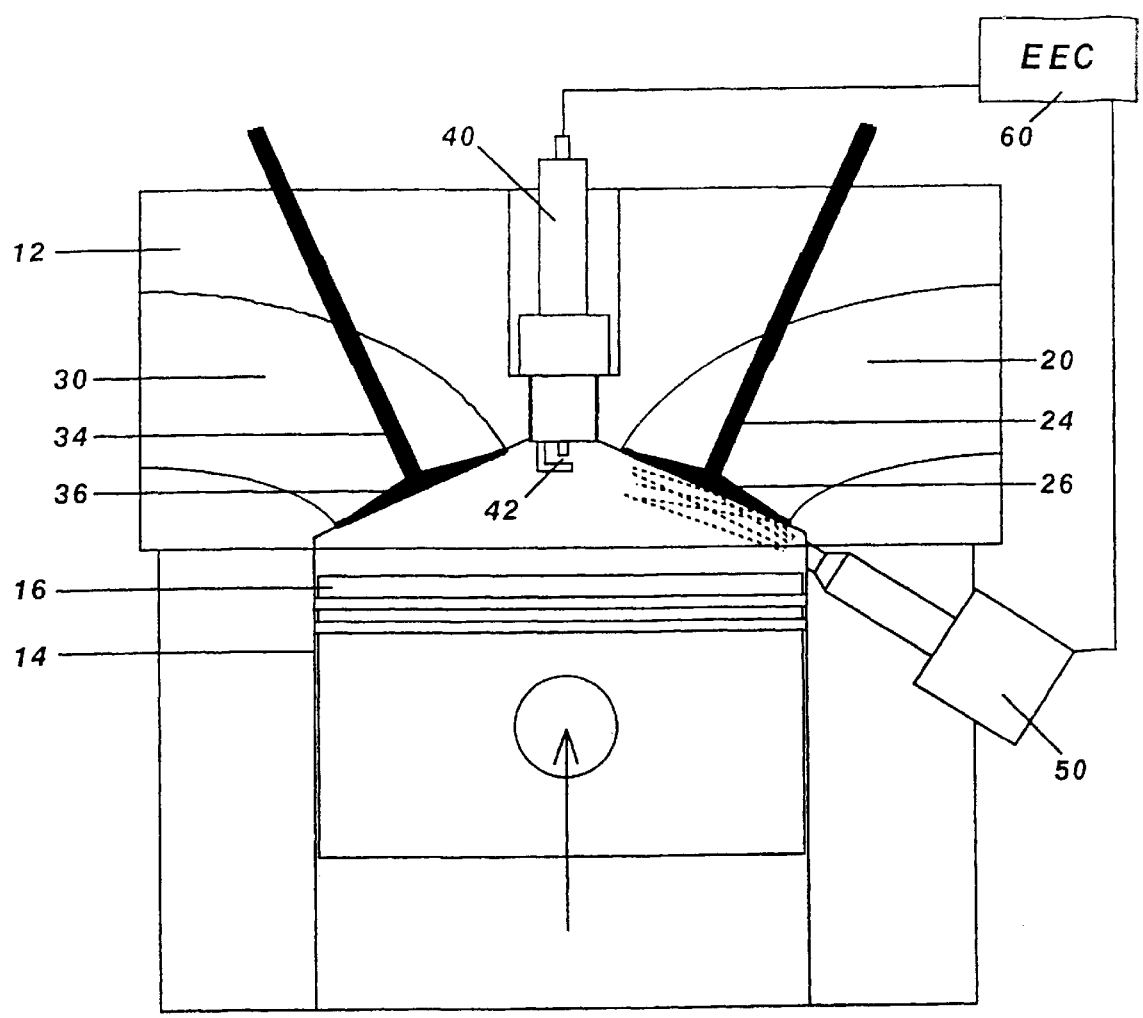
Figure 4:
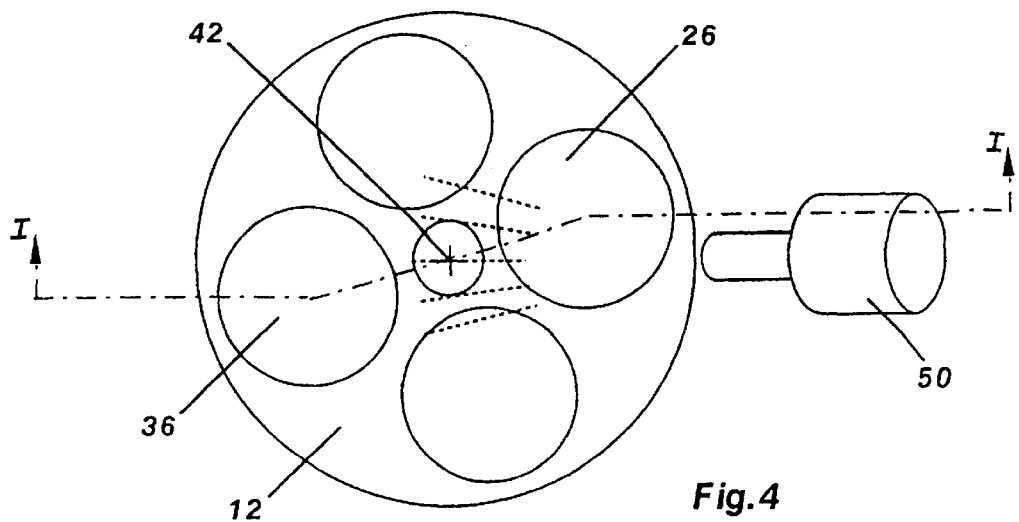

The invention will now be described further, by way of example, with reference to the accompanying drawings, in which:

FIG. 1 is a section through a cylinder of an engine of the invention, taken along the segmented section line I—I in FIG. 2 during the intake stroke, FIG. 2 is a view of the combustion chamber in FIG. 1 looking from the piston towards the cylinder head, FIG. 3 is a similar section to that of FIG. 1 showing the piston near the top of the compression stroke, and FIG. 4 is a view of the combustion chamber in FIG. 3 looking from the piston towards the cylinder head.

The engine in the drawings has a variable volume combustion chamber 10 defined between a piston 16 reciprocating in a bore 14 and a cylinder head 12 having intake ports 20 and exhaust ports 30. The intake ports 20 are controlled by two intake poppet valves having stems 24 and heads 26 and the exhaust ports 30 are controlled by two exhaust poppet valves having stems 34 and heads 36. A spark plug 40 having a spark gap 42 is located centrally in the cylinder head 12.

The engine is controlled by a management system that comprises a so-called EEC (Electronic Engine Control) unit 60. The EEC unit 60 is connected to receive signals from various sensors that measure the relevant operating parameters such as engine speed, load, temperature and crankshaft position and appropriately controls the ignition timing, the fuel quantity and the fuel injection timing in accordance with stored algorithms and calibration data.

Conventional design would place a high pressure direct fuel injector in the cylinder head pointing downwards away from the spark plug electrodes and towards the piston 16. It is such a geometry that is responsible for the wetting of the piston crown that in turn causes soot and hydrocarbon emissions. In the described preferred embodiment of the present invention, a fuel injector 50 controlled by the EEC unit 60 is located in the cylinder bore 14 at the periphery of the combustion chamber. In this position the injector 50 lies above the top piston ring in its top-dead-centre position, that is to say above the swept volume of the cylinder and in a permanently exposed position.

The orientation of the injector 50 and the design of its nozzle are such that the fuel spray of the injector is relatively narrow and is directed towards the spark plug 40. While this may be achieved by aiming the fuel spray directly towards the spark gap 42, it is preferred to direct the injector 50, in the manner illustrated in FIG. 3 of the drawings, such that the fuel spray impinges on the surface of the intake valve 26 and is deflected by this surface towards the spark gap 42. This reduces the risk of wetting the spark plug electrodes by allowing only fine droplets and fuel vapour to reach the spark gap 42.

With the same orientation of the injector 50, when the intake valve 26 is open, the injector 50 is also aimed through the mouth of the open intake valve 26 directly into the end of the intake port 20 to intercept the air curtain flowing at high speed in the opposite direction as represented by the arrows 28 in FIGS. 1. Hence as shown in FIG. 1 when fuel is injected during the intake stroke, the spray attempts to pass through the open intake valve 26 back into the end of the intake port 20. The bulk of the spray does not however land on the back of the intake valve 26 nor on the wall of the intake port 20 because the air 28 being drawn into the cylinder at high speed in the opposite direction will carry the fine spray with it into the combustion chamber 10. The extent of impingement of fuel droplets onto the rear surface of the valve 26 and the wall of the intake port 20 will be minimal because of the small wall area directly exposed to the spray and the fine atomisation of the spray by the high pressure fuel injector.

The fuel injector 50 is typically operated at a pressure of 50 kg/cm$^2$ which results in fine droplets of 20 to 40 microns in diameter and droplet speed in still air of around 40 m/s. The air curtain 28 meeting the fuel spray in the opposite direction is typically travelling at a comparable speed which gives a relative velocity of around 80 m/s when the fuel droplets meet the air. Because of the fine atomisation of the spray and the high relative velocity of the air, the viscous drag on the fuel droplets is very high and the rate of evaporation of the droplets is intense, the combined effect causing the droplets to follow the air intimately and diminish in size very rapidly. It is for this reason that the droplets rapidly change directions and are entrained back into the combustion chamber 10. Such droplets that do succeed, by virtue of their larger size and speed, to penetrate into the intake port 20 will have been slowed down, evaporated and reduced in size dramatically and only a minimal proportion will reach the opposite wall of the intake port 20. Most of the droplets will remain air-borne across the through flow cross-section of the intake port 20 and are entrained laterally by the air through flow, exiting with the air curtain 28, 28a, 28b surrounding the skirt of the intake valve 26.

Any impingement of the fuel spray on the rear face of the intake valve 26 and the side of the valve stem 24 can be avoided by designing the fuel injector nozzle with a narrow spray angle and aligning the fuel spray in an offset position from the valve stem 24 such that it directly penetrates across the through-flow cross-section of the intake port 20 as shown in FIGS. 1 and 2, without wetting the intake valve 26.

Wetting of the intake valve is not desirable for several reasons. First, the rate of evaporation of the liquid fuel film is significantly slower than that of very fine fuel droplets because of the much smaller surface area. Second, any liquid fuel film accumulating on the intake valve could cause fuel calibration delay problems during cold start and transient operating conditions. Third, the heat of evaporation of the fuel film is drawn from the intake valve and not from the intake air as in the case of dispersed fine droplets, resulting in lesser cooling of the intake air charge and lesser associated improvements in volumetric efficiency and knock tolerance compared with evaporation in air. The preferred embodiment of the invention ensures that substantially all the fuel injected back into the intake port 20 while the intake valve 26 is open is dispersed within the air and delivered into the combustion chamber 10 in the same engine cycle, homogeneously distributed throughout the intake charge.

As so far described the preferred embodiment of the invention provides an improvement over conventional direct injection engines in which the injector is aimed towards the piston, as it avoids wetting of the piston. It does not yet enable the engine to be optimised for ultra lean burn because the charge is homogeneous and may not be ignitable. To optimise lean burn, one needs to stratify the charge so that an ignitable cloud is present near the spark even though the bulk of the charge does not have sufficient fuel concentration to be ignitable on its own.

In the preferred embodiment of the invention, such charge stratification is achieved when required in an engine with the illustrated injector geometry by separately introducing a proportion of the desired total fuel quantity into the combustion chamber while the intake valve is closed near the end of the compression stroke, as shown in FIGS. 3 and 4. This injection is timed by the EEC unit 60 that also sets the spark timing in such a manner that an ignitable cloud of fuel and air will be present in the vicinity of the spark gap 42 at the instant that a spark is fired. The fuel injection occurs a brief period before the spark, to allow for the time taken for fuel to reach the vicinity of the spark plug after operation of the injector. This separately injected proportion of the fuel, which need only be a very small amount, will either pass over the head of the intake valve 26 or be deflected by the front face of the intake valve 26 and create a rich cloud near the spark gap 42 as shown in timed sequence in FIGS. 3 and 4 respectively. Even if the remainder of the charge is too lean to be ignitable, this cloud will be ignitable and once it has been ignited, a powerful ignition kernel will be created from which the flame will propagate to consume the entire charge.

The duration of fuel injection of the high pressure fuel injector during the intake stroke is typically in the range of 0.4 to 4.0 ms depending on engine load. At 4000 rpm engine speed, this corresponds to a maximum of 100 crank degrees out of an intake valve opening period of typically 240 crank degrees, making it entirely feasible to time the duration of the early injection of the major portion of the fuel to coincide with the period of maximum valve lift and maximum intake air velocity. The duration of the late injection of the small portion of the fuel towards the end of the compression stroke, on the other hand, should be as short as possible in order to avoid wetting the spark plug electrodes. This is typically in the order of 0.3 ms which is the shortest useable and repeatable duration within the design capability of the current high pressure fuel injector.

Under idling condition, the late injection near the end of the compression stroke could supply all the fuel needed. Under part load conditions, a combination of early and late injections can be used to achieve an overall lean mixture with a rich cloud next to the spark plug. Under high load conditions, one can dispense with the late injection and rely on a stoichiometric homogeneous charge achieved only by early injection.

Put differently, the engine can be operated at any time normally with a homogeneous stoichiometric mixture and a conventionally timed spark. For fuel economy during idling and part load conditions, the mixture strength can be reduced and this can be tolerated up to a certain lean burn limit with conventional ignition and fuelling strategy. The preferred embodiment of the invention allows the lean burn limit to be extended beyond this point whenever it is required by switching to a different mode in which a powerful ignition kernel is created by directing a brief puff of fuel towards the spark plug by means of a timed injection shortly before the normal spark.

It is important to note that the injector should be positioned at a sufficient distance from the spark plug for the above brief puff of fuel to vaporise before reaching the vicinity of the spark gap. Typically, the distance of the injector from the spark plug should correspond to a transit time of the fuel droplets amounting to several milliseconds. This precludes the injector from being mounted immediately adjacent the spark plug and the design of the combustion chamber dictates that the injector should be positioned at or near the periphery of the cylinder bore.

It should also be noted that even when operating at the limit of its lean burn capability, the bulk of the cylinder charge is homogeneously mixed and the only charge stratification that occurs is the result of the small local ignitable cloud near the spark gap forming a powerful ignition kernel. Thus once ignition has commenced, the flame propagates from the kernel and across a homogeneously mixed main charge, producing a lean burn exhaust emission characteristics which correspond to extrapolations of the typical curves obtained with homogeneous charge lean combustion, in which the $NO_x$ emissions continue to reduce as the homogeneous mixture strength is reduced.

This is to be contrasted with direct injection engines in which the entire charge is progressively stratified. Such engines typically have excessively rich combustion regions that result in the production of soot and high level of NOx and excessively lean combustion regions that result in high level of unburnt hydrocarbons because of incomplete combustion. The improvement in exhaust emissions of the present invention compared with engines in which the entire charge is progressively stratified would significantly reduce the burden on the exhaust after-treatment system necessary to meet legal emissions standards, while retaining similar fuel economy benefits.

Because the bulk of the charge is homogeneous, all known techniques for enhancing combustion such as increasing swirl, tumble or turbulence can be used in an engine of the present invention.

Though the invention has been described by reference to an engine with two intake and two exhaust valves per cylinder, this is not an essential feature of the invention and it can be applied with other valve configurations.

What is claimed is:

1. A spark ignition internal combustion engine having a variable volume combustion chamber (10) defined by a cylinder head, a cylinder bore (14) and a piston (16) reciprocating within the cylinder bore (16), the cylinder head having a spark plug (40) and intake and exhaust ports (20,30) leading through intake and exhaust valves (24,34) into the combustion chamber, wherein a fuel injector (50) is provided in the combustion chamber for direct injection of liquid fuel, the fuel injector (50) being positioned in an unswept part of the cylinder bore (14) and being oriented such that the fuel is aimed by the injector (50) along a line of sight that extends from the injector (50) through the mouth of the intake valve (24) when the intake valve is open and reaches directly into the end of the intake port (20), whereby fuel droplets from the injector (50) may pass into the end of the intake port without first impinging on the rear surface of the intake valve.

2. An internal combustion engine as claimed in claim 1, wherein the fuel spray from the fuel injector has a small conical angle and is aligned in an offset position from the stem of the intake valve such that the fuel spray enters directly into the intake port without impinging on the intake valve.

3. An internal combustion engine as claimed in claim 1, wherein the fuel spray is aimed towards the spark plug when injected during the compression stroke when the intake valve is closed, the spark plug being positioned in the cylinder head on the line of the fuel spray and on the opposite side of the intake valve from the fuel injector.

4. An internal combustion engine as claimed in claim 1, wherein means are provided for injecting fuel through the injector into the combustion chamber at times in the engine cycle when the intake valve (24) is open.

5. An internal combustion engine as claimed in claim 1, wherein means are provided for injecting fuel through the injector into the combustion chamber at times in the engine cycle when the intake valve is closed.

6. A method of operating an internal combustion engine, in which, at least during part load and full load operation of the engine, liquid fuel is injected into the combustion chamber during the intake stroke while an intake valve is open by means of an injector positioned in an unswept part of the cylinder bore, the fuel injector being oriented such that the fuel is aimed by the injector along a line of sight that extends from the injector through the mouth of the intake valve when the intake valve is open and reaches directly into the end of the intake port, whereby fuel droplets from the injector may pass into the end of the intake port without first impinging on the rear surface of the intake valve.

7. A method as claimed in claim 6, in which, at least during idling and part load operation, a small quantity of fuel is injected into the combustion chamber by means of the injector near the end of the compression stroke, the fuel passing over the closed intake valve to reach the vicinity of the spark plug.

* * * * *